US012493284B2

(12) United States Patent
Welle (10) Patent No.: US 12,493,284 B2
(45) Date of Patent: Dec. 9, 2025

(54) FIELD DEVICE HAVING A SECURITY MODULE, RETROFITTING MODULE FOR A FIELD DEVICE, METHOD FOR SETTING AN IT SECURITY LEVEL AND A COMPUTER PROGRAM CODE

(71) Applicant: VEGA GRIESHABER KG, Wolfach (DE)

(72) Inventor: Roland Welle, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 449 days.

(21) Appl. No.: 17/922,390

(22) PCT Filed: Apr. 28, 2021

(86) PCT No.: PCT/EP2021/061084
§ 371 (c)(1),
(2) Date: Oct. 31, 2022

(87) PCT Pub. No.: WO2021/224083
PCT Pub. Date: Nov. 11, 2021

(65) Prior Publication Data
US 2023/0185287 A1 Jun. 15, 2023

(30) Foreign Application Priority Data
May 5, 2020 (EP) ..................................... 20172976

(51) Int. Cl.
*G05B 19/418* (2006.01)
(52) U.S. Cl.
CPC ... *G05B 19/41845* (2013.01); *G05B 19/4185* (2013.01)

(58) Field of Classification Search
CPC .......... G05B 19/41845; G05B 19/4185; G05B 19/0428; G05B 19/41875; G05B 2219/32368
See application file for complete search history.

(56) References Cited

U.S. PATENT DOCUMENTS

2002/0026586 A1* 2/2002 Ito ......................... H04W 12/50
713/183
2010/0308959 A1* 12/2010 Schorn ..................... G07C 9/15
340/5.2

(Continued)

FOREIGN PATENT DOCUMENTS

| DE | 2016110723 A1 | 12/2017 |
| EP | 3451215 A1 | 6/2019 |
| EP | 3509247 A1 | 7/2019 |

OTHER PUBLICATIONS

Buskey, Ronald F., and Barbara B. Frosik. "Protected jtag." 2006 International Conference on Parallel Processing Workshops (ICPPW'06). IEEE, 2006 (Year: 2006).*

(Continued)

*Primary Examiner* — Christopher E. Everett
(74) *Attorney, Agent, or Firm* — William Gray Mitchell (57) ABSTRACT

A process automation field device having field device electronics with at least one communication interface and a security module with a plurality of functional units for implementing a plurality of predetermined IT security levels of different severity, the security module having a selection element for selecting an IT security level, the functional units necessary for implementing the selected IT security level being activated and/or the unnecessary functional units being deactivated on the basis of the selection.

18 Claims, 3 Drawing Sheets

(56) References Cited

U.S. PATENT DOCUMENTS

2013/0305062 A1* 11/2013 Falk ..................... H04L 67/12
  713/193
2017/0187728 A1*  6/2017 Edwards ............ H04L 63/1408
2019/0089744 A1*  3/2019 Hornung ................ H04L 63/20
2019/0147179 A1*  5/2019 Maneval ................ H04L 63/10
  726/27

OTHER PUBLICATIONS

International search report for action for related International application PCT/EP21/61084, issued on Jun. 28, 2021.
Office Action from Taiwanese Patent Office for related application 110116246, issued Feb. 6, 2025.

* cited by examiner

FIELD DEVICE HAVING A SECURITY MODULE, RETROFITTING MODULE FOR A FIELD DEVICE, METHOD FOR SETTING AN IT SECURITY LEVEL AND A COMPUTER PROGRAM CODE

CROSS REFERENCE TO RELATED APPLICATIONS

This patent application claims priority International Patent Application PCT/EP2021/061084, filed on Apr. 28, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is field device having a security module, retrofitting module for a field device, method for setting an IT security level and a computer program code.

Background of the Invention

The term field device in this case subsumes various technical systems which are directly related to a production process. Field devices may therefore be actuators, sensors and measuring transmitters and/or evaluation instruments in particular.

Superordinate units, which are to be assigned to the field of control rooms, should be clearly differentiated from field devices in the terminology, as they are used in the present application.

Known field devices for process automation have hitherto had only producer-specifically defined devices and methods for implementing aspects of IT security. Recent legal requirements in various countries require the implementation of predetermined security levels (SL) for critical infrastructure systems (KRITIS).

For many years, field devices have, as process measuring devices, reliably measured process-relevant measured values of media in a very wide range of applications. In the initial years of process control engineering, the measured values determined were for the most part transmitted in an analogue manner with the aid of analogue interfaces, for example a 4-20 mA interface, from a process measuring device to a superordinate unit, for example an evaluation device or a process control centre. In the course of digitization, this standard was extended by the additional imposition of digital signals, for example in accordance with the HART standard, as a result of which bidirectional communication between process measuring device and process control centre also became possible. However, it was characteristic of such process control systems that the installations were substantially operated using isolated operation. A connection between different process control systems of different sites or different companies or a connection of the systems to the World Wide Web was not provided.

In recent years, with the approaches of the fourth industrial revolution (Industry 4.0) in particular, the necessity has been established for linking entire process control systems or else also entire production sites to one another by a higher degree of networking, for example via the World Wide Web. The associated networking of industrial IT systems and office IT systems leads however to a series of new challenges, particularly in the field of IT security, which makes continued development of existing devices and components urgently necessary.

A further field of application results due to self-supporting field devices, particularly self-supporting sensors, which have become available recently. Sensors, that is to say field devices of this product family are characterized by particularly simple assembly without attaching a communication or supply line. The measured values determined by these field devices are typically transmitted to a cloud, that is to say to a server in the World Wide Web, using a narrowband radio technology (LoRa, Sigfox, NB-IOT). Typical use scenarios for such field devices include fields such as flood forecasting, inventory management or even other decentralized distributed measurement tasks. Due to the direct connection to the World Wide Web, such field devices are inherently exposed to a permanent threat due to hacker attacks from the web.

In order to ensure the availability of productive systems even in the future, standards are currently defined by various industries, which aim to harden the components of process management systems with respect to their resilience with respect to negligently or maliciously initiated external attacks and therefore to increase the availability of the field device and therefore to ensure the productivity of the installation operators.

Furthermore, new requirements for the operators and producers of devices are formulated on the part of legislators, which pursue the aim of making critical infrastructure systems (KRITIS), such as for example energy (power, gas, oil), transport (air, rail, water, road), drinking water supply or else digital infrastructure resistant with respect to negligent or malicious hacker attacks. An example of this is the directive 2016/1148 (NIS directive) agreed by the European Parliament, which has since been implemented in national law by the member states of the European Union.

Depending on the vulnerability at the respective usage site, it has been required in hitherto existing cybersecurity standards (e.g. IEC 62443, ISO 27001), that the devices used there meet a standardized IT security level (SL).

IEC 62443 (status as of August 2013) for example, has defined the following security levels for this, which are classified according to the means available to the attacker, material and financial resources available to the attacker, technical capabilities and the underlying motivation of the attacker.

| Capabilities of the attacker | | | | |
|---|---|---|---|---|
| | Means | Resources | Capabilities | Motivation |
| SL0 | no risk of impairment/manipulation | | | |
| SL1 | inadvertent/incidental impairment/manipulation | | | |

-continued

| Capabilities of the attacker | | | | |
|---|---|---|---|---|
| | Means | Resources | Capabilities | Motivation |
| SL2 | simple | limited | generic | low |
| SL3 | sophisticated | medium | domain-specific | medium |
| SL4 | sophisticated | comprehensive | domain-specific | high |

The security level SL0 is a purely theoretical construct here, in which there is no impairment or manipulation risk whatsoever and therefore no measures are necessary.

The security level SL1 describes the capability of a system to avoid inadvertent and unintentional impairments or manipulations.

The security level SL2 describes the capability of a system to repel intentional manipulations by interested individuals and companies with generic security knowledge.

The security level SL3 describes the capability of a system to repel intentional manipulations by experts and companies which, with clear aims, develop and deploy effective, yet cost-orientated attack scenarios.

The security level SL4 describes the capability of a system to repel intentional manipulations of organizations with experts, for whom reaching the specifically selected attack target at virtually any price is paramount.

During the implementation of these security levels, individual security levels can be combined or additional security levels can be introduced as intermediate levels.

For producers of field devices, particularly also for the producers of fill-level and pressure sensors, there is a growing need from these boundary conditions to implement the IT security requirements which are anchored in different (industry specific) standards and laws in an appropriate manner during the development and later during the operation of the field devices by means of cooperation of correspondingly realized hard- and software components.

This implementation of extended measures regularly makes it necessary to integrate additional hardware components and/or additional software components into the field devices. In association with this, the energy consumption of the devices sometimes increases strongly, which, particularly in the case of battery-operated field devices, may shorten the service life or at least the time intervals of required maintenance cycles.

In addition, there is the problem that industry specific standards with the IT security levels SL respectively defined therein must be taken into account from a technical point of view. That aside, the different regulations from the part of the legislator are also to be taken into account.

An obvious solution consists in providing devices for the different industries in a targeted fashion, which take account of the respectively required industry specific IT security levels SL from a technical point of view. However, in order to be prepared for all possible use cases within a refinery for example, different devices must also be provided in principle for each IT security level required by the customer. It is obvious that this approach massively increases the variety of device variants and therefore makes the cost-effective development and production of corresponding field devices uneconomical. If by contrast, in principle only one single industry specific device is provided, which implements the highest security level, this would lead to high hardware costs and high energy consumption connected with reduced ergonomics during operation of the devices.

It is the object of the present invention to develop a field device such that the problems known from the prior art are mitigated or eliminated.

BRIEF SUMMARY OF THE INVENTION

In a preferred embodiment, a process automation field device having field device electronics with at least one communication interface and a security module with a plurality of functional units for implementing a plurality of predetermined IT security levels of different severity, the security module having a selection element for selecting an IT security level, the functional units necessary for implementing the selected IT security level being activated and/or the unnecessary functional units being deactivated on the basis of the selection.

In another preferred embodiment, the field device as described herein, characterized in that the security module is designed such that a one-time selection of the IT security level is possible.

In another preferred embodiment, the field device as described herein, characterized in that the security module is designed such that a selection of the IT security level is possible during commissioning of the field device.

In another preferred embodiment, the field device as described herein, characterized in that the security module is configured such that a selection of the IT security level is possible during initial commissioning of the field device exclusively.

In another preferred embodiment, the field device as described herein, in that the selection unit is designed in a mechanically irreversible manner.

In another preferred embodiment, the field device as described herein, characterized in that the security module is designed such that a selection of the IT security level is electronically irreversible.

In another preferred embodiment, the field device as described herein, characterized in that the security module is designed such that a selection of the IT security level is irreversible in terms of software technology.

In another preferred embodiment, the field device as described herein, characterized in that the field device has the lowest IT security level upon delivery and the security module is designed such that an increase of the IT security level is possible exclusively.

In another preferred embodiment, the field device as described herein, characterized in that the field device has the highest IT security level upon delivery and the security module is designed such that a lowering of the IT security level is possible exclusively.

In another preferred embodiment, the field device as described herein, characterized in that the selection element is designed as a hardware switch, preferably as a slide switch or rotary switch.

In another preferred embodiment, the field device as described herein, characterized in that the selection element is designed as part of a user interface of the field device.

In another preferred embodiment, the field device as described herein, characterized in that the selection element activates a multiplexer, which is connected to the functional units for implementing the IT security level.

In another preferred embodiment, a retrofitting module for a process automation field device having field device electronics with at least one communication interface, the retrofitting module having a security module, the security module having a selection element for selecting an IT security level, the field device electronics and/or the security module having a plurality of functional units for implementing a plurality of predetermined IT security levels of different severity, the security module cooperating with the field device electronics such that functional units necessary for the implementation are activated and/or unnecessary functional units are deactivated.

In another preferred embodiment, the retrofitting module as described herein, characterized in that the retrofitting module has a cryptomodule for signing and/or encrypting data.

Th In another preferred embodiment, the retrofitting module as described herein, characterized in that the retrofitting module has a communication module for transmitting data of the field device to a superordinate unit.

In another preferred embodiment, the retrofitting module as described herein, characterized in that the retrofitting module has an authentication module.

In another preferred embodiment, a method for setting an IT security level in a process automation field device having a security module with a plurality of functional units for implementing a plurality of predetermined IT security levels of different severity, the security module having a selection element for selecting an IT security level, having the steps:
selecting a desired IT security level by means of the selection element,
reading the selection element,
activating necessary functional units and/or deactivating unnecessary functional units for implementing the selected IT security level.

In another preferred embodiment, the method as described herein, in which setting of an IT security level can be carried out only once, preferably once during commissioning of the field device, further preferably, once and compulsorily during commissioning of the field device.

In another preferred embodiment, the method as described herein, in which the setting of the IT security level is only possible once, in that the selection element is mechanically deactivated.

In another preferred embodiment, the method as described herein, in which the setting of the IT security level is only possible once, in that the selection element is electrically deactivated.

In another preferred embodiment, the method as described herein, in which the setting of the IT security level is only possible once, in that the selection element is deactivated using software.

In another preferred embodiment, the method as described herein, in which the field device has the lowest IT security level upon delivery and this can only be increased during setting.

A computer program code for setting an IT security level in a process automation field device having a security module, which, when it is executed in a processor, causes the same to execute a method as described herein.

DETAILED DESCRIPTION OF THE INVENTION

A process automation field device according to the invention having field device electronics with at least one communication interface has a security module with a plurality of functional units for implementing a plurality of predetermined IT security levels of different severity, the security module further having a selection element for selecting an IT security level, the functional units necessary for implementing the selected IT security level being activated and/or the unnecessary functional units being deactivated on the basis of the selection.

The basic idea of the present invention is to configure field devices such that the same are made capable of realizing different predetermined IT security levels.

The field device according to the invention can in this manner be used for more than one security level, so that a security level, which is adapted to the planned use and the IT security requirements predetermined as a result, can be selected and used. In this manner, the user does not have to accept any unnecessary impairments in terms of convenience of operation, for example. Furthermore, the field device also only consumes the energy required for the respective IT security level, so that devices that are operated self-sufficiently in terms of energy in particular do not consume unnecessary energy.

In this context, a plurality of functional units for implementing a plurality of predetermined IT security levels means that at least two different IT security levels can be implemented by means of at least two functional units.

In the present application, functional units is understood to mean function blocks implemented in hardware or software, which are decisive for compliance with the predetermined IT security levels. In particular, the IT security levels of different severity differ in terms of one functional unit, i.e. at least one functional unit is activated or deactivated to implement the one IT security level, which is correspondingly not activated or deactivated to implement a different IT security level. Preferably, at least one of the functional units is implemented in hardware and at least one of the functional units is implemented in software.

The IT security levels on which this application is based may relate to various aspects of IT security and be implemented by means of various measures, which are combined in the present application in the functional units.

Aspects of IT security, as can be implemented in the representational IT security levels of the application, are inter alia various levels of identification and authentication of users, devices and software, usage control, securing the communication of the field device with regards to authentication and integrity, and also for example required reaction times.

In one embodiment of the field device, the security module is designed such that a one-time selection of the IT security level is possible. This means in this context that the IT security level can be selected once and is subsequently fixed, that is to say unchangeable. In particular, the IT security level can be selected once by the user. This means that the field device in the delivery state can have no or any desired IT security level which can be predetermined by the producer, and which can then be changed once by the user.

A one-time user-side selection may in this case in particular mean that a subsequent user-side change of the IT security level is not possible. In certain embodiments, it is possible to differentiate between a user-side change of the IT security level and an administrator-side change of the IT security level. This means that it can be provided in an embodiment that an administrator can also still subsequently change the IT security level even after an initial setting during commissioning. To this end, it may however be provided for example, that this can take place in addition to an authentication as administrator only using a device-specific unlock code and/or using an additional producer-side approval.

To ensure that the field device can only be operated with the desired security level, the security module can be configured such that a selection of the IT security level during commissioning of the field device is possible and in particular required.

In this manner, the operator of an installation can be urged to select the appropriate security level during the commissioning of a new field device. This is then set and fixed with the commissioning. Additionally or alternatively to the above-described procedure, subsequent changing of the IT security level may be connected with resetting of the field device to factory settings, i.e. to the delivery state and thus with renewed commissioning.

In order to exclude manipulation, the security module can be configured such that a selection of the IT security level is possible during initial commissioning of the field device exclusively.

This can for example take place in that the selection element is designed in a mechanically irreversible manner. A mechanically irreversible design of the selection element can for example take place by means of a suitable latching of a one-time activated setting. Such a latching can e.g. be configured such that a change of the selection element is only possible towards a higher IT security level. Alternatively, the selection element can also be fixed mechanically, for example adhesively bonded or fixed in another manner. Additionally or alternatively, a mechanical selection element can also have a predetermined breaking point, i.e. the selection element breaks off at this predetermined breaking point during initial user-side setting of the IT security level upon successful setting and thus makes subsequent changing of the IT security level impossible.

Additionally or alternatively, the security module can be configured such that a selection of the IT security level is electronically irreversible. This may be achieved for example in that after first reading of the selection element, the electrical connections required therefor are interrupted. This may take place for example by means of the targeted interruption of fuses installed there or the destruction of the electrical readability of the selection element in another way. Additionally or alternatively, functional elements, which are deactivated for implementing the selected IT security level, can also be hindered during the setting of the IT security level from reactivating by means of permanent interruption of the electrical connection to these functional elements.

For example, it may be specified that a radio interface be decommissioned for implementing a certain IT security level. In the previously described embodiment, a reactivation of the radio interface can be prevented in that for example an electrical connection to the radio interface is permanently interrupted or for example a transmission element is made dysfunctional in a targeted fashion.

Additionally or alternatively, the security module can be configured such that a selection of the IT security level is irreversible in terms of software technology. For example, a part of a program code, which realizes reading of the selection element and setting of the IT security level, can after successful setting of the IT security level be deleted or otherwise changed such that a renewed reading of the selection element is not possible. In this embodiment, the selection element could then—if a change is not also suppressed at this point—be adjusted to the selection of a different one compared to the set IT security level, but this changed selection is no longer read and the IT security level is therefore not adjusted.

In order to ensure that a once selected IT security level is at least not lowered, i.e. an IT security level with a lower IT security level is subsequently selected, it may be provided that the field device has the lowest IT security level upon delivery and the security module is designed such that an increase of the IT security level is possible exclusively. This functionality can be achieved both by a suitable configuration of the hardware, for example the selection element, and a suitable software implementation.

Alternatively, it is also possible that the field device is delivered in the highest IT security level and only a lowering of the IT security level is possible.

In one embodiment, the selection element can be designed as a hardware switch, preferably as a slide switch or rotary switch. By means of such a hardware switch, a selection of the IT security level can take place intuitively and in a user-friendly manner. A design of the selection element implemented in hardware may form an effective protection against network-based attacks and thus contribute to securing the field device.

In a further embodiment, the selection element can be designed as a selection menu in a user interface of the field device. Typically, the process of commissioning a field device comprises various parameterization steps, into which a selection of the IT security level can seamlessly be introduced in this manner.

In an embodiment of the field device, the selection element may activate a multiplexer, which is connected to the functional units for implementing the IT security level at least in the delivery state. In this manner, the various functional units for implementing the IT security level can be activated or deactivated via a suitable activation of the multiplexer.

In an embodiment, the field device can have an application unit. An application unit of this type may for example be designed in a manner suitable for detecting the country of commissioning (often in combination with the selection of the language of the display units) and the respective industry of the operator. From this and, if appropriate, further requested information, a security-level determination device, which is installed in the field device, can autonomously determine which minimum security level SL is appropriate for the respective use case and suggest this during commissioning. Thus, for example, during commissioning in a European country inside a drinking water reservoir, it can be determined by the field device autonomously, that operation inside an installation of a critical infrastructure system (KRITIS) is desired here, which may for example require operation in the IT security level SL3. In addition to a suggestion, it may also be provided that only an increase of the IT security level is possible, but a lower IT security level is prevented or at least requires authentication using a user with elevated access rights.

A retrofitting module for a process automation field device having field device electronics with at least one communication interface, the retrofitting module having a security module, the security module having a selection element for selecting an IT security level, the field device electronics and/or the security module having a plurality of functional units for implementing a plurality of predetermined IT security levels of different severity, the security module cooperating with the field device electronics such that functional units necessary for the implementation are activated and/or unnecessary functional units are deactivated.

A corresponding retrofitting module therefore enables the implementation of IT security levels of different severity and a selection of a desired IT security level. In this case, due to the retrofitting module, IT security levels can also be realized, which the field device could not have realized without the retrofitting module.

Features of security levels which are enabled by the retrofitting module may for example be a hard- or software-based signature of encryption of the communication, a hard- or software-based implementation of a second factor for user authentication or user management. Furthermore, such a retrofitting module may also comprise a firmware update for the field device present. By means of such a firmware update for the field device, it can for example be ensured that for example the field device electronics—depending on the selected security level—only still accept certain communication paths, remote terminals or add-on modules and/or a deinstallation of the retrofitting module is denied.

The retrofitting module may in this case—as already explained with respect to the field device according to the invention—have various mechanisms which ensure an irreversible determination of the security level.

The retrofitting module, can in one embodiment have a cryptomodule for signing and/or encrypting data. The cryptomodule can in this case implement software- or hardware-based signing of data for ensuring data integrity, i.e. the protection of data from change and/or encryption of data to protect the data against unauthorized access. This can take place both for local storage of the data and for the transmission thereof to a superordinate unit.

In a further embodiment, the retrofitting module has a communication module for transmitting data of the field device to a superordinate unit. Such a communication module may e.g. establish a secure connection to other devices in the known manner. Alternatively, a proprietary communication to other producer-specific devices may also be established, so that secure communication is ensured.

In a further embodiment, the retrofitting module has an authentication module. An authentication module can for example implement user authentication and/or user management and superordinate password management. The user authentication may in this case not only comprise authentication of operating personnel, but rather also implement authentication of permitted control devices and/or communication partners.

In an embodiment, the retrofitting module can have an application unit. An application unit of this type may for example be designed in a manner suitable for detecting the country of commissioning (often in combination with the selection of the language of the display units) and the respective industry of the operator. From this and, if appropriate, further requested information, a security-level determination device, which is installed in the retrofitting module, can autonomously determine which minimum security level SL is appropriate for the respective use case and suggest this during commissioning. Thus, for example, during commissioning in a European country inside a drinking water reservoir, it can be determined by the retrofitting module autonomously, that operation inside an installation of a critical infrastructure system (KRITIS) is desired, which may for example require operation in the IT security level SL3. In addition to a suggestion, it may also be provided that only an increase of the IT security level is possible, but a lower IT security level is prevented or at least requires authentication using a user with elevated access rights.

It is pointed out once more at this point that the retrofitting module is a hardware module in particular, which is physically connected to the field device. This can be used easily in the case of modularly constructed field devices in particular and can therefore toughen up an available field device with a security module with little outlay and thus effect the setting of an IT security level.

A method according to the invention for setting an IT security level in a process automation field device having a security module with a plurality of functional units for implementing a plurality of predetermined IT security levels of different severity, the security module having a selection element for selecting an IT security level, has at least the following method steps:

A desired IT security level is selected by means of the selection element. This can be realized by means of corresponding hard- and/or software.

The selection element is subsequently read. This means that the selected IT security level is determined.

On the basis of the selected IT security level, i.e. the IT security level chosen using the selection element, the functional elements necessary for implementing the selected IT security level are activated and/or the unnecessary functional units are deactivated.

It is mentioned at this point that activation and deactivation relates to operation of the field device and in this context means persistent commissioning or decommissioning of the respective functional units. Deactivation or in other words switching off of the entire field device does not have any influence in this case on the status of the functional units after a renewed switching on of the field device.

In a preferred embodiment of the method, setting of the IT security level can be carried out only once, preferably once during commissioning of the field device, further preferably, once and compulsorily during commissioning of the field device.

In this manner, it is prevented that the IT security level, which was set once, is subsequently still changed, particularly lowered. Thus, it is impossible for attackers to set an IT security level, once it has been set, to a lower IT security level and to exploit the then valid, lower security requirements for example to spy on data.

If an IT security level is set once and compulsorily during commissioning of the field device, then it is ensured as a result that during the commissioning, the security level must compulsorily be selected and also can no longer be changed subsequently. In the case of the use of the field devices for example in critical infrastructure systems (KRITIS), it is in this manner prevented that a field device can be operated without an IT security level set during commissioning.

A method, in which the setting of the IT security level is only possible once, is achieved in that the selection element is mechanically deactivated during the initial selection of the IT security level. That is to say, a subsequent change of the IT security level is prevented in that the selection element is mechanically deactivated, i.e. is rendered inoperable.

Additionally or alternatively, the selection element can be electrically deactivated and also achieved in such a manner that only a one-time setting of the IT security level is possible. This may take place for example in that after the initial reading of the selection element, the electrical connections required for reading are cut. For example, fuses may be used for this, which are cut after the reading of the selection element.

A further possibility which can additionally or alternatively be used in the method is that the selection element is deactivated using software. This can take place for example by deactivating or deleting the code sections needed for the selection element. Likewise, reading of the selection element can take place by deactivating or deleting the code elements required therefor. A further possibility consists in it being possible that although the selection element can furthermore be changed and read, this does not have an effect on the set IT security level.

In order to prevent utilization of the selectability of the IT security level, the method can be configured such that the field device has the lowest IT security level upon delivery and this can only be increased during setting. Thus, independently of whether a selection of the IT security level is only possible once or not, it is prevented that the IT security level, once set, is lowered.

In an alternative embodiment, the method can also provide that the field device has the highest selectable IT security level upon delivery and this can only be lowered.

An embodiment of the method can provide using an application unit. The application unit may for example be designed in a manner suitable for detecting the country of commissioning (often in combination with the selection of the language of the display units) and the respective industry of the operator. From this and, if appropriate, further requested information, the security-level determination device, which is installed in the field device or retrofitting module, can autonomously determine which minimum security level SL is appropriate for the respective use case and suggest this to a user. Thus, for example, during commissioning in a European country inside a drinking water reservoir, it can be determined by the field device or retrofitting module autonomously, that operation inside an installation of a critical infrastructure system (MUTTS) is desired here, which may for example require operation in the IT security level SL3. In addition to a suggestion, it may also be provided in the method that only an increase of the IT security level is possible, but a lower IT security level is prevented or at least requires authentication using a user with elevated access rights.

A computer program code according to the invention for setting an IT security level in a process automation field device having a security module is configured such that, when it is executed in a processor, it causes the same to execute a method as described above.

A use location of the field device or the retrofitting module can in this case also be determined automatically by various localization services. For example, a satellite-based localization, such as GPS or Galileo, a localization on the basis of mobile wireless networks or else on the basis of locally available wireless networks can take place for this. An automated localization additionally has the advantage that for example in the case of mobile applications, the security level can be adapted depending on the use location of the field device. In this manner, e.g. increased manipulation protection for mobile applications may be provided or else anti-theft protection can be implemented.

DETAILED DESCRIPTION OF THE FIGURES

The exemplary embodiments of field devices presented in the following show exemplary implementations for the implementation of IT security levels SL on the basis of the definitions of the standard IEC 62443. The examples should have a purely exemplary character for clarifying the fundamental structures and processes and in principle include the transfer to other existing or future arising standards with comparable concepts for the standardized definition of security levels according to the understanding of the present invention.

Figure 1:
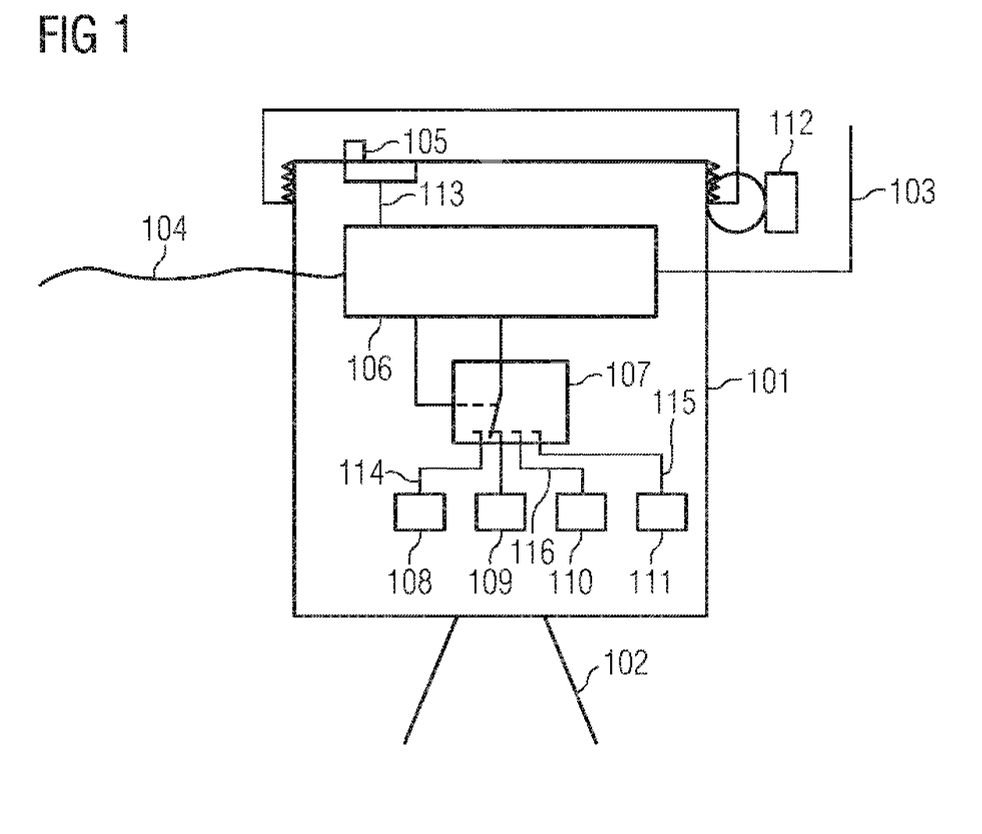
FIG. 1 is a line drawing evidencing a first exemplary embodiment of a field device according to the present application.

FIG. 1 shows a first exemplary embodiment of a field device 101 according to the present application. The illustration shown in FIG. 1 is purely schematic and only shows the components relevant for the selection and implementation of the IT security level.

The field device 101 is realized to detect a process variable, for example a fill level, via a measurement interface 102 and to provide the same externally via a wired communication interface 104 or a wireless interface 103. The field device 101 has a selection element 105, for example a slide switch with four selectable positions, for specifying an IT security level SL. A processor 106 of the field device 101 detects the IT security level SL specified by the user on the basis of a position of the selection element 105 and activates the position, which belongs to the set IT security level SL, of a multiplexer 107 which is connected to functional units 108, 109, 110, 111. The functional units 108, 109, 110, 111 contain hard- and software elements, which are necessary for the IT security levels according to the underlying definition, for example on the basis of a standard, in order to achieve one of the security levels, in the case of IEC 62443 one of the IT security levels SL1, SL2, SL3 or SL4.

The principle of the present invention should be clarified in the following on the basis of the example of user authentication.

In the initial position of the slide switch 105, the security level SL1 is predetermined, which corresponds to the lowest level of IT security. In the event of access by a user, the authentication module belonging to SL1 is activated in the functional unit 108, which contains a mechanism for only approving access to the field device 101 if a user is identified and authenticated using a (desired) user name and password.

If the slide switch 105 is in the second position, however, then the IT security level SL2 is detected by the processor 106. A login request for gaining access to the field device 101 is in this case processed by the functional unit 109, which contains mechanisms for managing a predeterminable list of users with the associated passwords and individual access rights, that is to say a user management system.

In the event of positioning the slide switch 105 in the third position, IT security level SL3 is determined. The associated functional unit 110 will in this case grant access to the field device 110 in the case of a request from a trusted network 104, if a known user identifies themselves with their individual password. In the event of access from an untrusted network 103, the unit 110 will only grant access however, if a registered, permitted user can authenticate themselves via multifactor authentication, for example by inputting a password and additionally placing an NFC chip with electronic access code.

If the slide switch 105 is in the fourth position, the highest IT security level is required. A login attempt in mode SL4 is processed by the functional unit 111, which—independently of the network 103, 104 from which a request originates—only allows the access to the field device 101 with its values and settings in principle via multifactor authentication.

It is pointed out at this point that with the activation of a certain IT security level, certain hardware units, which may be contained in the functional units 108, 109, 110, 111, can be activated and/or deactivated. Thus, for example the IT security levels SL3 and SL4 require the use of hardware-based authentication elements, in order to fundamentally prevent possible manipulation by malware at this critical point, whilst in the levels SL1 and SL2, software elements can take on this task, which may contribute to energy saving.

It may be provided in the case of activation of a high IT security level to deactivate insecure access points of the field device. It may for example be provided to deactivate a wireless interface 103 if the security level SL3 or SL4 is selected. It may further be provided that this deactivation is configured to be irreversible, for example by deleting the associated software sections or by cutting fuses in supply lines for these hardware units.

it can be seen from the above example that both the computing outlay and the energy consumption and likewise the ergonomics of the user guidance can be influenced directly by the choice of IT security level.

It is pointed out at this point that in addition to the user login, a multiplicity of further security-critical use cases of corresponding regulatory requirements, for example standards and directives, can be recorded and documented with corresponding minimum requirements with regards to the technical implementation. The hard- and software units necessary for implementing the minimum requirements can be integrated in the functional units 108-111. Furthermore, the multiplexer 107 may consist of hard- and software units. It may be provided to realize parts of the multiplexer 107 and the functional units 108-111, if the same can be realized in software, in the processor 106.

Specifying the IT security level SL using the slide switch 105 may in itself lead to a security risk. It may therefore be provided to realize other selection elements 105, for example lockable selectors, which can only be changed by service personnel authorized by the producer. It may however also be provided to make the selection element 105 accessible for the customer, and after predetermined setting of the IT security level SL, to protect the same against unauthorized change, for example by means of a closing element 112 or by means of the irreversible breaking off of the slide element 105 at a predetermined breaking point.

It may also be provided to implement the selection element 105 by means of a software interface. In an embodiment, the access to this element can be limited to the initial commissioning of a field device 101 after delivery from the factory. In a further embodiment, it may be provided that the sensor 101 in principle leaves the factory in the highest security level SL4, and a user is only placed in a position to change the positioning of the selection element 105 which is implemented in software after correspondingly comprehensive identification and authentication. It may also be provided to deliver the device 101 with a low security level, in order to allow a change of the security level to higher IT security exclusively after authentication has taken place.

It may be provided to enable a change of the selection element 105 only prior to or during initial commissioning. This may for example be achieved in that a connecting line 113 is irreversibly interrupted after the reading of the position of the selection element 105 by the processor 106, for example by targeted blowing of a fuse in the connecting line 113. Additionally and/or alternatively, it may be provided to irreversibly deactivate the functional elements 108, 109, 110, 111 no longer required according to the required security level by blowing fuses in the connecting lines 114, 115, 116. It may also be provided to delete software elements that are not required in the functional elements 114, 115, 116, 117 irreversibly and permanently or to interrupt the supply lines to the memory elements, which contain the software elements, irreversibly.

Figure 2:
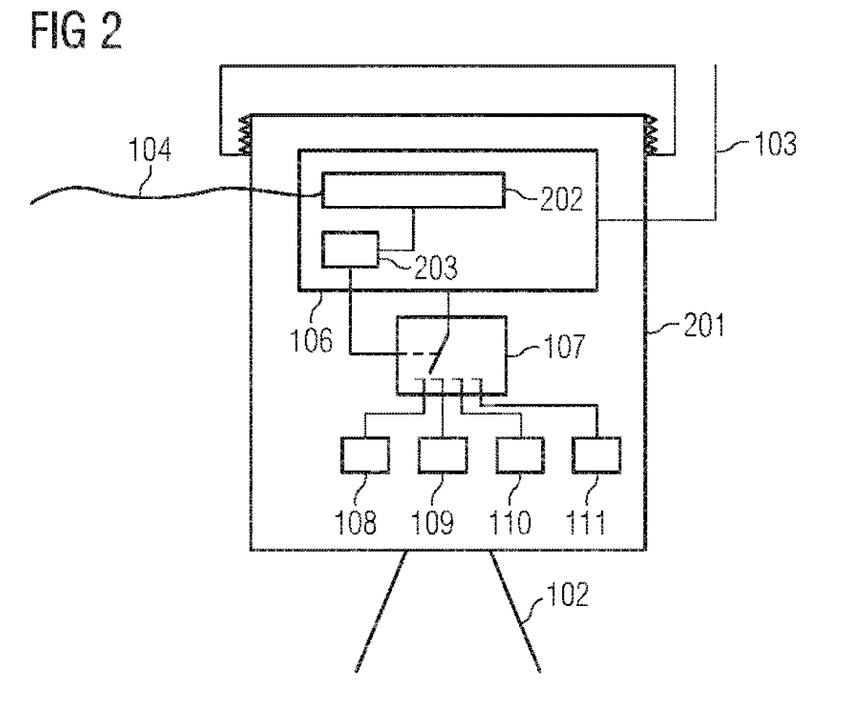
FIG. 2 is a line drawing evidencing a second exemplary embodiment of a field device according to the present application.

FIG. 2 shows a second exemplary embodiment of a field device 201 according to the present application. The basic idea of this embodiment is to integrate the necessity of activating an IT security level SL required for the respective use directly into the field device 201 according to the invention, i.e. to carry out a selection of an IT security level compulsorily during commissioning of the field device 201. Customers of process measuring devices already have the possibility today of defining the most important operation-relevant parameters of a device by using a commissioning wizard or by means of corresponding input forms of PCs or apps or display and control modules. An application unit 202 can for example be used for this. The application unit 202 may for example be designed in a manner suitable for detecting the country of commissioning (often in combination with the selection of the language of the display units) and the respective industry of the operator. From this and, if appropriate, further requested information, the security-level determination device 203, which is installed in the field device 201, can autonomously determine which security level SL is appropriate for the respective use case. Thus, for example, during commissioning in a European country inside a drinking water reservoir, it can be determined by the field device 201 autonomously, that operation inside an installation of a critical infrastructure system (KRITIS) is desired here, which may for example require operation in the IT security level SL3. By activating the security level selector 203, the required security level SL can be set in accordance with the principles already discussed in connection with the procedures associated with FIG. 1.

Often, in addition to IT security and—especially in the case of critical infrastructure systems (KRITIS)—in addition to robustness of devices with respect to unauthorized access, industry-specific or national standards (e.g. IEC 62443-1-1) also require reliable function and continuous availability of device function. Therefore, it can additionally be provided both in the exemplary embodiment of FIG. 1 and in the exemplary embodiment of FIG. 2, to activate hard- and software units, which elevate the functional security of the devices (e.g. according to IEC 61508) to a predefined level.

Figure 3:
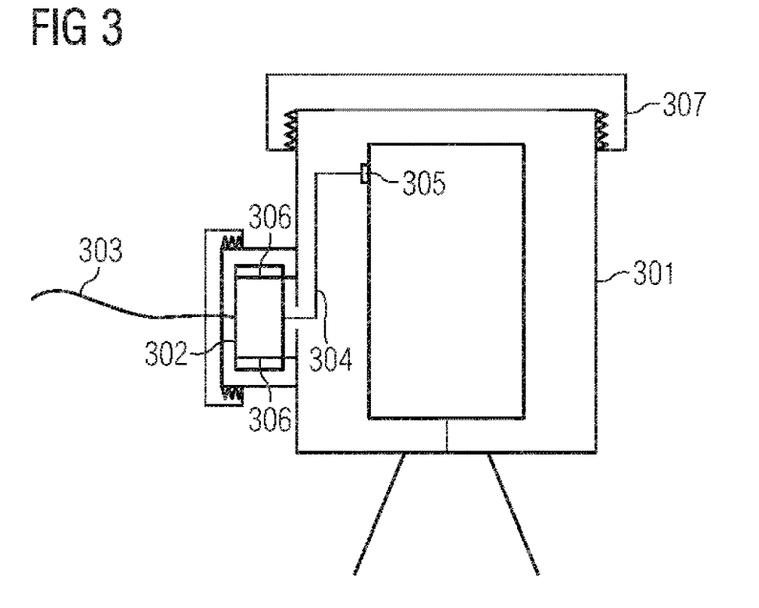
FIG. 3 is a line drawing evidencing a third exemplary embodiment of a field device according to the present invention, comprising a retrofitting module.

FIG. 3 shows a third embodiment of a field device 301 having a retrofitting module 302.

The field device 301 shown in FIG. 3 therefore discloses a possibility for retrofitting an existing field device 301, which previously did not have a predefined IT security level SL. Such field devices 301 have been produced for many years and it is a challenge for the producers of the field devices 301 to equip existing devices with extended IT security levels SL. Potential IT-relevant security attacks can take place in a range of devices essentially only via a wired interface 303. It is therefore an approach to separate a communication line 303 of the field device 301 and install a retrofitting module 302 with a security module for implementing corresponding IT security levels SL, which module can for example be accommodated in a second chamber of a housing of the field device 301. The retrofitting module 303 can be configured in a suitable manner to have a wired output line 304 with a predefined length, which is configured to connect an original contacting interface 305 of the existing field device 301. It may additionally or alternatively be provided to fasten the retrofitting module 302 on the field device 301 such that it can no longer be removed, for example using secure screw connectors 306, which can be fixed using adhesive. In addition, it may be provided to replace an original housing lid (not illustrated) with a housing lid 307 which is self-adhesive and therefore cannot be removed again.

The retrofitting module 302 takes on a range of security functions for the field device 301, depending on the required IT security level SL, that is to say for example user management, authentication, encryption or else other functions, which may be required by the respective standard according to the desired IT security level SL. It may in particular also be provided that the retrofitting module 302 acts as a firewall and continuously checks and if appropriate rejects the incoming data packets.

It may be provided, depending on the desired IT security level SL, to provide various retrofitting modules 302 for retrofitting at the customer or in the factory. It may also be provided to configure the retrofitting module 302 such that it can be configured in accordance with the above exemplary embodiments and thus realizes different IT security levels.

A field device 301 retrofitted in this manner can subsequently only still be reached externally via the communication line 303 by means of the retrofitting module 302 and the security module contained therein. An unauthorized access and manipulation at the installation site can be reliably prevented by adhesively bonding the sensor lid 307.

Figure 4:
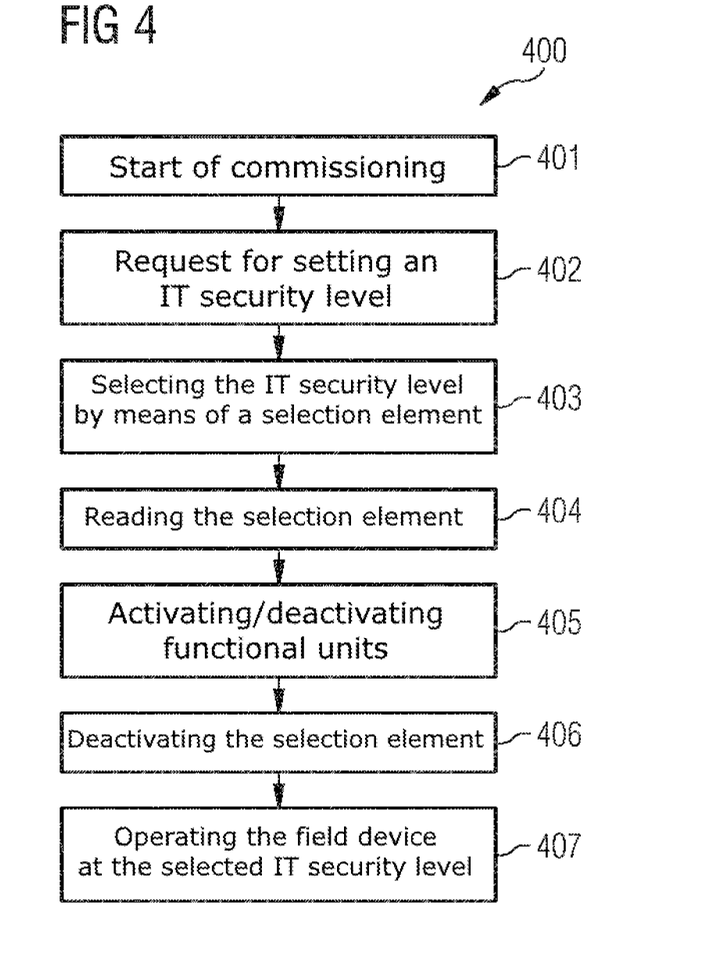
FIG. 4 is a line drawing evidencing an exemplary embodiment for a method according to the present application.

FIG. 4 shows a possible embodiment of a method 400 for setting an IT security level SL according to the present application in a flow chart.

FIG. 4 schematically illustrates the sequence of the method 400 and in particular does not exclude the inclusion of further method steps for setting the IT security level SL or for operating the field device 101, 201, 301.

In a first step 401, the commissioning of the field device 101, 201, 301, which can be configured according to one of the preceding FIGS. 1 to 3, is begun.

In the course of the commissioning process, the user is requested in a step 402 to select an IT security level SL, for example in accordance with the four IT security levels SL1, SL2, SL3, SL4 described above, and if appropriate to confirm this selection.

In a step 403, the IT security level SL is selected by means of the selection element 105 and in a following step 404, the selection element 105 is read.

Depending on the selected and read IT security level SL, in a further step 405, the functional units 108-111 necessary for the implementation of the selected IT security level SL are activated and the functional units 108-111 not necessary for the implementation are deactivated. Unnecessary functional units also explicitly comprises the functional units which have to be deactivated for implementing the selected IT security level, for example the deactivation of a functional unit.

In the presently discussed exemplary embodiment of a method 400 for setting an IT security level SL, the selection element 105 is deactivated in a further step 406. This can take place in an implementation of the method in software for example by deleting program sections or otherwise rendering the same inaccessible.

After the setting of the selected IT security level SL, the field device is operated at the selected IT security level.

LIST OF REFERENCE NUMBERS

Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A process automation field device having field device electronics with at least one communication interface and a security module with a plurality of functional units for implementing a plurality of predetermined information technology (IT) security levels of different severity, the security module having a selection element for selecting an IT security level, the functional units necessary for implementing the selected IT security level being activated and the unnecessary functional units being deactivated on the basis of the selection, wherein the functional units are implemented as functional blocks in hardware and software, and the functional units comprise hardware elements and software elements, and wherein the security module is configured such that a selection of the IT security level is possible and required during initial commissioning of the field device exclusively.

2. The field device according to claim 1, wherein the selection unit is designed in a mechanically irreversible manner.

3. The field device according to claim 1, wherein the security module is designed such that a selection of the IT security level is electronically irreversible.

4. The field device according to claim 1, wherein the security module is designed such that a selection of the IT security level is irreversible in terms of software technology.

5. The field device according to claim 1, wherein the field device has the lowest IT security level upon delivery and the security module is designed such that an increase of the IT security level is possible exclusively.

6. The field device according to claim 1, wherein the field device has the highest IT security level upon delivery and the security module is designed such that a lowering of the IT security level is possible exclusively.

7. The field device according to claim 1, wherein the selection element is designed as a slide switch or rotary switch.

8. The field device according to claim 1, wherein the selection element is designed as part of a user interface of the field device.

9. The field device according to claim 1, wherein the selection element activates a multiplexer which is connected to the functional units for implementing the IT security level.

10. A retrofitting module for a process automation field device having
field device electronics with
at least one communication interface,
the retrofitting module having a security module,
the security module having a selection element for selecting an information technology (IT) security level,
the field device electronics and/or the security module having a plurality of functional units for implementing a plurality of predetermined IT security levels of different severity, wherein the functional units are implemented as functional blocks in hardware and software and the functional units comprise hardware elements and software elements, the security module cooperating with the field device electronics such that functional units necessary for the implementation are activated and unnecessary functional units are deactivated, wherein the security module is configured such that a selection of the IT security level is possible and required during initial commissioning of the field device exclusively.

11. The retrofitting module according to claim 10, wherein the retrofitting module has a cryptomodule for signing and/or encrypting data.

12. The retrofitting module according to claim 10, wherein the retrofitting module has a communication module for transmitting data of the field device to a superordinate unit.

13. The retrofitting module according to claim 10, wherein the retrofitting module has an authentication module.

14. A method for setting an information technology (IT) security level in a process automation field device having a security module with a plurality of functional units for implementing a plurality of predetermined IT security levels of different severity, wherein the functional units are implemented as functional blocks in hardware and software and the functional units comprise hardware elements and software elements, the security module having a selection element for selecting an IT security level, wherein the security module is configured such that a selection of the IT security level is possible and required during the initial commissioning of the field device exclusively, comprising the steps:

selecting a desired IT security level by means of the selection element, reading the selection element, and activating necessary functional units and deactivating unnecessary functional units for implementing the selected IT security level.

15. The method according to claim 14, wherein a setting of the IT security level is only possible once, in that the selection element is mechanically deactivated.

16. The method according to claim 14, wherein a setting of the IT security level is only possible once, in that the selection element is electrically deactivated.

17. The method according to claim 14, wherein the setting of the IT security level is only possible once, in that the selection element is deactivated using software.

18. The method according to claim 14, wherein the field device has the lowest IT security level upon delivery and this can only be increased during setting.

* * * * *